United States Patent [19]

Harrison et al.

[11] Patent Number: 4,693,775

[45] Date of Patent: Sep. 15, 1987

[54] HOT MELT, SYNTHETIC, MAGNETIC SEALANT

[75] Inventors: Bruce L. Harrison, St. Louis; Richard J. Wall, Florissant, both of Mo.

[73] Assignee: United Technologies Automotive, Inc., Dearborn, Mich.

[21] Appl. No.: 836,917

[22] Filed: Mar. 6, 1986

[51] Int. Cl.⁴ ............................................. B32B 31/00
[52] U.S. Cl. ........................... 156/272.4; 156/244.17; 156/244.24; 156/244.25; 156/309.6; 156/327; 252/62.54; 264/177.17; 264/177.2
[58] Field of Search ......................... 427/47, 128–137; 428/900, 356; 252/62.54; 264/177.17, 177.2; 156/145, 155, 157, 244.17, 244.24, 244.25, 272.4, 309.6, 327

[56] References Cited

U.S. PATENT DOCUMENTS

| | | | |
|---|---|---|---|
| 2,959,832 | 11/1960 | Baermann | 427/128 X |
| 3,668,176 | 6/1972 | Childress | 260/37 |
| 4,405,674 | 9/1983 | Kyle | 427/128 X |
| 4,427,481 | 1/1984 | Smith | 428/356 |

*Primary Examiner*—Bernard D. Pianalto
*Attorney, Agent, or Firm*—Alan C. Cohen

[57] ABSTRACT

An improved magnetic sealant is disclosed wherein the improvement comprises the introduction of magnetizable particles having a particle size of about 150 microns or larger into the resin. It has been found that the larger particle sizes allows for the introduction of increased amounts of magnetic particles into the resin without the loss of flow properties. This results in a sealant which will have strong magnetic properties but will be an effective sealant for irregular surfaces as well as smooth ones. Also disclosed is a method for making the sealant and a method for using it.

10 Claims, 5 Drawing Figures

HOT MELT, SYNTHETIC, MAGNETIC SEALANT

DESCRIPTION

1. Technical Field

The present invention relates to the field of art which pertains to sealants and adhesives, in particular those which possess magnetic properties.

2. Background Art

Synthetic adhesives having magnetic properties have been known for some time. The magnetic property of these adhesives is created by introducing magnetic particles of small particle sizes, typically below 150 microns, into the base adhesive composition. However, it is known that the introduction of increasing amounts of these magnetic particles, while increasing the magnetic properties of the adhesive, also significantly reduces the sealant's flow properties. This creates a problem when the adhesive is placed over an irregular surface wherein a portion of the adhesive is not in contact with the substrate. In such a situation, the magnetic attraction of the adhesive may be sufficient to maintain the sealant in place on the substrate, however it may not be sufficient to overcome the high viscosity of the resin and draw it into all of the irregularities on the substrate, thereby failing to create a void-free seal.

To overcome this high viscosity, one may try to increase the magnetic strength of the adhesive by introducing more of the magnetized particles thereby increasing the magnet strength of the tape. However, it has been found that by increasing the concentration of the magnetic particles disclosed in the prior art, the viscosity of the adhesive is increased, thereby making it more difficult to flow and offsetting the increase in magnetic strength. An alternative approach is to lower the concentration of magnetic particles in the adhesive thereby reducing their effect on the viscosity of the resin. However, this in turn reduces the magnetic attraction of the adhesive to the substrate such that the adhesive will not remain in position on the substrate during processing.

This problem is particularly acute in the automobile industry's attempt to seal ferrometallic components which are situated at near vertical positions in the automobile and which have irregular surfaces or where the adhesive must be overlapped when applied. It has been found that prior art adhesives having sufficient magnetic properties to maintain their position on the substrate during processing and curing do not possess sufficient flowability to seal the components without leaving voids in the seal, through which water or exhaust vapors may be forced into the passenger compartment. One particularly troublesome spot is the "toe plate" on the car which is the vertical plate behind the pedals and under the glove compartment on the passenger's side.

Therefore, what is required in this art area is an improved magnetic, hot melt adhesive which will have sufficient magnetism to maintain its position on a substrate which is near vertical during the curing process yet will have improved flowability resulting in a seal which is void free.

DISCLOSURE OF INVENTION

The present invention is for an improved hot melt, synthetic adhesive comprising a synthetic adhesive resin impregnated with about 60 percent to about 80 percent by weight of magnetic particles having a particle size greater than 150 microns. The adhesive has improved flowability at the higher concentrations of magnetic particles due to the removal of the lower end particle sizes below about 150 microns. It has been determined that by removing these smaller particle sizes, a higher concentration of particles may be introduced into the adhesive without substantially reducing its flowability during curing. This results in an adhesive which, when the adhesive is overlapped, or applied to an irregular surface, will result in a substantially void-free seal.

Additionally, the application is directed to a method of making an improved hot melt, synthetic, magnetic adhesive having the above disclosed composition.

Further, this invention discloses a method of sealing an irregular surface, using the improved adhesive disclosed, to form a seal which is substantially void free.

Other features and advantages will be apparent from the specification and claims and from the accompanying drawings which illustrate an embodiment of the invention.

BEST MODE FOR CARRYING OUT THE INVENTION

Figure 1:
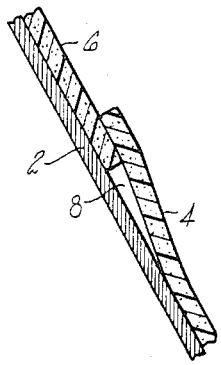
FIG. 1 is a cross-sectional view of a typical lap joint of magnetic adhesive prior to curing.

Conventional synthetic sealants may be used to practice this invention. The basic resin adhesive may be thermoplastic or thermosetting. These hydrocarbon resins may be both aromatic or aliphatic with the aromatic resins being preferred. Typical thermoplastic materials are hydrocarbon resins, which are typically used in the adhesive and sealant industry such as styrene and acrylic monomers, while typical thermosetting resins may be ethylene propylene diene terpolymer (EPDM), polyisoprene, and styrene butadiene. The preferred material being styrene butadiene rubber resins. Some preferred styrene butadiene materials may be Ameripol 1009 available from B. F. Goodrich Company, and Kraton 1101 available from Shell Chemical Company. Other conventional resin systems such as Wingtac 95, Wingtac 10, Escorez 2001, Nevchem 100, Amoco 210 and Hercules A75 may also be used The adhesive will typically be composed of about 20 percent to about 40 percent of the base synthetic resin material, with about 25 percent to about 33 percent by weight being preferred, exclusive of the magnetic particles, the rest of the adhesive will be composed of additives.

Conventional additives may be added to the base adhesive resin to gain the requisite physical properties of a particular sealant material. These will typically be, but need not be limited to, adhesive agents, fillers, or plasticizers which are typically used to prepare sealants or adhesives. Adhesive curing agents may be methacrylates, epoxies, polyamides, while typical fillers may be calcium carbonate, clay, barrites or silica and plasticizers such as adipates, phthlates, and process oils such as naphthenic or paraffinic. Such adhesive agents are normally present in concentrations from about 0 percent to about 7 percent by weight. The fillers are present from about 0 percent to about 25 percent by weight and the plasticizers are present from about 5 percent to about 30 percent by weight, each of these being in percent by weight of the adhesive prior to the introduction of the magnetic particles.

The key feature of the invention is the ability to increase the magnetic properties of the adhesive without substantially reducing the adhesives ability to flow during cure. This objective is accomplished by limiting the particle size of the magnetic particle to those which are greater than 150 microns and preferably between 150 microns to 650 microns. One simple way of selecting the particles in a particular range is to pass the particles through a series of standard screens or sieves and utilize that portion of the particles which remain on the 150 micron (100 mesh ASTM (American Society for Testing and Materials)) or higher screen while discarding that which passes through.

It is the omission of the lower particle sizes, from these sealants which allows for an introduction of increased weight percent of magnetic particles but without substantially decreasing the flowability of the adhesive during curing which is contrary to prior art teachings.

These larger particle sizes of the magnetic material are mixed with the adhesive resin in concentration of about 60 percent to about 80 percent by weight with about 65 percent to about 75 percent being preferred.

These particles may be comprised of any conventional magnetizable material such as barium ferrite or strontium ferrite, other materials may be iron oxides, i.e. $Fe_3O_4$, $Fe_2O_3$, or powdered Alnico alloys with the preferred being strontium ferrite.

The preparation of these adhesive materials requires mixing the adhesive resin and other components into a homogenous mixture. It may be that to ensure ease of mixing, the adhesive should be heated or warmed to a temperature which will allow for ease of mixing but will not cure the resin. Typically, this temperature will be about 50° C. to about 70° C.

Once the adhesive has been mixed, the magnetizable particles are mixed in with the resin and typically are dispersed uniformly throughout the adhesive. All of this may be performed using conventional mixing or stirring devices.

The adhesive is then extruded through conventional extrusion equipment into a tape or other desired form. It should be noted that since the particle sizes used in the sealant may be larger than normally used in extrusion processess, the extrusion head should be selected to have an opening to accommodate them. Should one be using a selectively small extruder head opening, the particle size range of the metallic particles may be limited accordingly.

The extruded material is then passed through an electrical field which magnetizes the particles and aligns them in strips or lines along the tape. These electrical fields are conventional and may be generated by A.C. rectified current, direct current or capacitor discharge. The magnetized adhesives will typically have gauss readings of about 150 to 300. These gauss readings will be an average over a number of positions along the tape and it is desired and preferred that the gauss readings be in excess of 200.

Once the tape has been magnetized, it may be cut into the desired lengths or shapes and is ready to apply it to a substrate.

Figure 3:
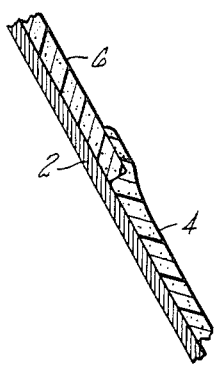
FIG. 3 is a cross-sectional view of a typical lap joint of cured adhesive of the present invention.

Although this material may be applied to any ferrometallic surface to seal or bond it, it is particularly designed to be used when, for one reason or another the adhesive cannot be in total contact with the substrate and the substrate is in a near vertical position. Such situations require an adhesive which has excellent flow properties when heated but with sufficient magnetic strength to maintain its position during curing. As discussed in the "Background" this often occurs when one piece of tape overlaps another as shown in FIG. 1. This figure shows a metal substrate 2 for an automobile wherein the adhesive strips 4 and 6 have been overlapped leaving a sizable gap 8 between the adhesive and the substrate. When the adhesive is cured through the application of heat, its viscosity is reduced and the magnetic particles draw the adhesive into the gap, thereby filling it as demonstrated in FIG. 3.

Figure 2:
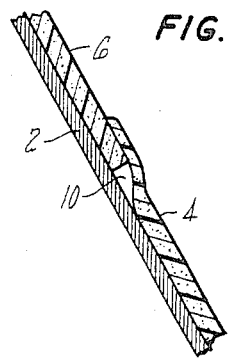
FIG. 2 is a cross-sectional view of a typical lap joint of cured prior art adhesive.

The prior art sealant, when overlapped and cured, would leave a void through which water or exhaust fumes could pass and enter the passenger compartment. This is depicted in FIG. 2 in which the substrate 2 on which two adhesive strips 4 and 6 are placed, one overlapping the other. When the sealant is cured, a void 10 (exaggerated to more clearly show the voids) remains due to the fact that sealant was not capable of free enough flow to fill the gap which existed when the sealant strips were overlapped or in the alternative, the adhesive strip would flow properly but the magnetic strength would have been reduced so low that the adhesive would slide off of its position on the substrate.

The magnetic sealant of the present invention has superior qualities over similar adhesives of the prior art in that it allows for the introduction of increased quantities of magnetic particles into the resin thereby increasing its ability to adhere to the ferrometallic substrate, even when that substrate is at a difficult angle, yet will flow properly when heated and cured to produce a seal which is substantially void free even on irregular substrate surfaces.

Although there is no accepted way of measuring the flowability of these sealants, one test which is accepted in the automobile industry is to lap joint the adhesive, then cure it and then squirt water under the lap-jointed region and note any water which emerges. If water passes through, then the joint fails.

The ability of the present sealants to flow better and fill the voids in irregular surfaces is evident from the results of comparative tests performed using the resin system of the example above and varying the quantity of magnetic particles and their sizes. Two studies were made, one where the particle sizes used were below 150 microns and the other where the same resin system was used and introducing magnetic particles greater than 150 microns as taught in the present disclosure.

Figure 4:
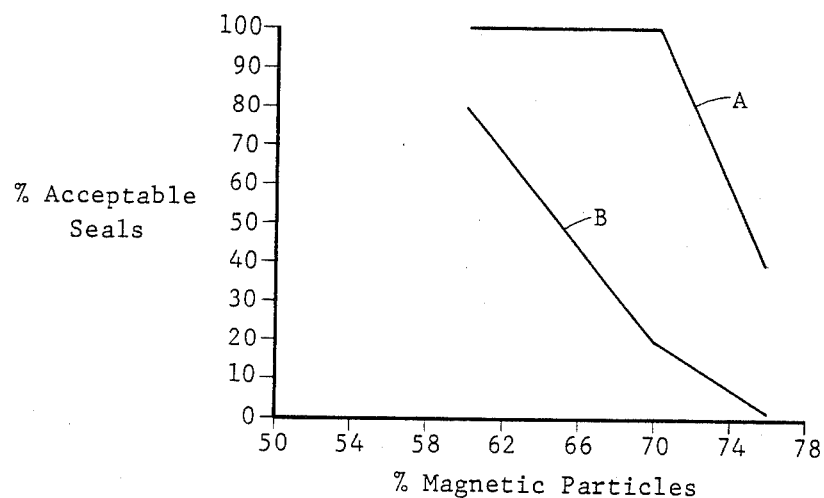
FIG. 4 is comparative test results indicating percentage of acceptable seals in a lap joint test of identical resins between the prior art adhesive and the present invention.

The magnetic tape was prepared having 60 percent, 70 percent and 76 percent by weight of each type of particles. The strips were 0.07 inch thick, 2 inches wide, and were laid up in lap joint arrangement on a sheet of steel and cured at 163° C. for one-half hour. The resulting lap joints were then tested to see if any water could be forced through the joints. If water passed through the joint, then the joint was not sealed and it was considered unacceptable. The failure of the joint to properly seal is an indication of its inability to flow properly. As may be seen in FIG. 4, as the concentration of the smaller particles are increased, the flow is reduced and the number of acceptable seals (indicated by B) achieved is much lower than those achieved when the same quantity of particles which are in excess of 150 microns in size (indicated by A) are added to the resin.

Figure 5:
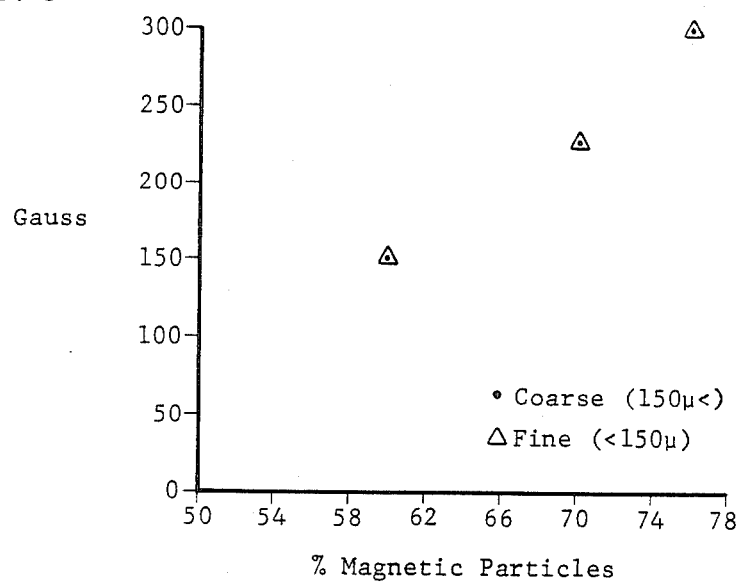
FIG. 5 shows comparative test results indicating gauss strength of the prior art adhesive and the present invention.

Additionally, it is shown in FIG. 5 that the use of the coarser particles does not reduce the magnetic strength of the sealant when the same weight percent is used. This results in a sealant which will stay in place during curing, yet will flow sufficiently to seal an irregular surface.

It should be understood that the invention is not limited to the particular embodiments shown and described herein, but that various changes and modifications may be made without departing from the spirit and scope of this novel concept as defined by the following claims.

We claim:

1. An improved hot melt, magnetized sealant particularly adapted for use on ferrometallic material comprising a synthetic resin sealant containing magnetic particles wherein the improvement comprises the presence of about 60 percent to about 80 percent by weight of magnetic particles in which the particle size is greater than 150 microns, resulting in an adhesive which forms a substantially void free seal over irregular surfaces.

2. The adhesive of claim 1 wherein the particle sizes of the magnetic particles is about 150 microns to about 650 microns.

3. The adhesive of claim 1 wherein the magnetic particles are selected from the group consisting of barium ferrite, strontium ferrite and mixtures thereof.

4. A method of manufacturing an improved hot melt, magnetized adhesive particularly adapted for use on ferrometallic material comprising
 homogenously mixing a synthetic resin adhesive with about 60 percent to about 80 percent by weight of magnetizable particles having particle sizes greater than 150 microns; extruding said mixtures to form a thin tape of adhesive material, passing said tape through an electromagnetic field thereby magnetizing the particles, said adhesive having improved magnetic properties and flow characteristics.

5. The adhesive of claim 1 wherein the resin is a styrene butadiene rubber.

6. A method for sealing an irregular surface using a hot melt, magnetized adhesive comprising
 applying a strip of a hot melt, magnetized adhesive of a synthetic resin containing about 60 percent to about 80 percent by weight of magnetized particles having particle sizes greater than 150 microns to a ferrometallic substate, heating the magnetic adhesive to cause the adhesive to become compliant and drawn onto the substrate by the magnetic field forming a substantially void free seal.

7. The adhesive of claim 1 wherein the synthetic adhesive is a thermoplastic material.

8. The adhesive of claim 1 wherein the synthetic adhesive is a thermosetting material.

9. A method of improving the flowability during curing of a hot melt magnetic sealant comprising:
 preparing a synetic resin adhesive having about 60 percent to about 80 percent by weight of magnetizable particles wherein the particle size of the magnetic particles is greater than 150 microns,
 extruding said mixture to form a tape of adhesive material,
 passing said tape through an electromagnetic field thereby magnetizing the particles.

10. An improved hot melt, magnetized sealant particularly adapted for use on ferrometallic material comprising a synthetic resin sealant containing magnetic particles wherein the improvement comprises the presence of about 60 percent to about 80 percent by weight of magnetic particles in which the particles size is greater than 150 microns, wherein said sealant has improved flowability compared to the said sealant compositions having the particle sizes ranging below 150 microns.

* * * * *